United States Patent
Lu et al.

(10) Patent No.: US 10,377,336 B2
(45) Date of Patent: Aug. 13, 2019

(54) MOLDED AIR BAG CHUTE WITH DOOR REINFORCED BY HOLLOW CHANNEL

(71) Applicant: FORD GLOBAL TECHNOLOGIES, LLC, Dearborn, MI (US)

(72) Inventors: Li Lu, Bloomfield Hills, MI (US); Hui Wang, Novi, MI (US); Yi Yang Tay, Plymouth, MI (US); Liying Qi, Troy, MI (US); Nicholas A. Mazzocchi, Ann Arbor, MI (US); Kenneth J. Kwasnik, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 71 days.

(21) Appl. No.: 15/810,748

(22) Filed: Nov. 13, 2017

(65) Prior Publication Data

US 2019/0143929 A1    May 16, 2019

(51) Int. Cl.
  *B60R 21/215* (2011.01)
  *B60R 21/2165* (2011.01)
  *B60R 21/205* (2011.01)
  *B60R 21/217* (2011.01)
  *B29L 31/30* (2006.01)

(52) U.S. Cl.
  CPC ........ *B60R 21/2171* (2013.01); *B60R 21/205* (2013.01); *B60R 21/215* (2013.01); *B60R 21/2165* (2013.01); *B29L 2031/3038* (2013.01); *B60R 2021/2172* (2013.01)

(58) Field of Classification Search
  CPC ......... B60R 2021/2172; B60R 21/215; B60R 21/2165; B60R 21/205; B29L 2031/3038
  USPC .............................................. 280/728.3, 732
  See application file for complete search history.

(56) References Cited

U.S. PATENT DOCUMENTS

| 4,989,896 A * | 2/1991 | DiSalvo | B60R 21/2165 280/728.3 |
| 5,333,901 A * | 8/1994 | Barnes | B60K 37/00 180/90 |

(Continued)

FOREIGN PATENT DOCUMENTS

| EP | 2052919 A1 * | 4/2009 | ........ B60R 21/215 |
| JP | 05131888 A * | 5/1993 | |

(Continued)

*Primary Examiner* — Keith J Frisby
(74) *Attorney, Agent, or Firm* — Vichit Chea; MacMillan, Sobanski & Todd, LLC (57) ABSTRACT

An air bag chute assembly for an automotive instrument panel is injection molded to form an integral deployment chute, door, and attachment flange, The flange attaches to the instrument panel around an aperture in the instrument panel. The tubular chute extends interiorly from the flange to a lower end configured to receive an inflating air bag from an air bag module and defines a deployment path along a longitudinal axis. A door flap is disposed in an upper end of the chute rotatable from the flange to emerge through the aperture. The flap has an interior side impacted by the inflating air bag carrying a plurality of raised strengthening ribs. The flap has at least one closed-section hollow channel protruding from the interior side to a channel height extending beyond the strengthening ribs formed by gas-assist injection molding.

14 Claims, 9 Drawing Sheets

(56) References Cited

U.S. PATENT DOCUMENTS

| | | | |
|---|---|---|---|
| 5,375,874 A * | 12/1994 | Zushi | B60R 21/2165 280/728.3 |
| 5,741,045 A | 4/1998 | DeRees et al. | |
| 5,803,487 A * | 9/1998 | Kikuchi | B60R 21/205 280/728.2 |
| 5,941,557 A * | 8/1999 | Mullins, Jr. | B60R 21/216 280/728.3 |
| 6,053,527 A * | 4/2000 | Gans | B60R 21/215 280/728.1 |
| 6,171,543 B1 | 1/2001 | Hirose | |
| 6,364,346 B1 | 4/2002 | Preisler et al. | |
| 6,612,607 B1 * | 9/2003 | Takahashi | B29C 45/0081 280/728.2 |
| 6,955,376 B1 * | 10/2005 | Labrie | B29C 45/14 280/728.3 |
| 7,556,284 B2 | 7/2009 | Riha et al. | |
| 9,434,095 B2 | 9/2016 | Marchetti et al. | |
| 2004/0164524 A1 * | 8/2004 | Ono | B60R 21/2165 280/728.3 |
| 2007/0108741 A1 * | 5/2007 | Yasuda | B29C 65/06 280/728.3 |
| 2014/0375025 A1 * | 12/2014 | Pauthier | B60R 21/205 280/728.3 |
| 2016/0075301 A1 * | 3/2016 | Kwasnik | B60R 21/2165 280/728.3 |
| 2018/0345898 A1 * | 12/2018 | An | B60R 21/215 |

FOREIGN PATENT DOCUMENTS

| | | | |
|---|---|---|---|
| JP | 11-139236 | * | 5/1999 |
| JP | 2001113555 A | | 4/2001 |
| JP | 2001114055 A | * | 4/2001 |
| JP | 2002211341 A | * | 7/2002 |
| JP | 2002225662 A | * | 8/2002 |
| JP | 3439847 B2 | * | 8/2003 |
| JP | 3904657 B2 | * | 4/2007 |
| JP | 4306712 B2 | * | 8/2009 |
| KR | 20020089062 A | * | 11/2002 |
| KR | 20090019259 A | * | 2/2009 |

* cited by examiner

MOLDED AIR BAG CHUTE WITH DOOR REINFORCED BY HOLLOW CHANNEL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive air bag systems, and, more specifically, to a hidden air bag deployment door formed by an instrument panel substrate and a molded air bag chute.

Air bag deployment chute assemblies have been put into commercial use for the passenger side of an instrument panel of automotive vehicles. The chute assembly couples an air bag module (typically containing a folded canvas bag and chemical propellants for inflating the bag on command) to a door support panel or substrate of the instrument panel. A typical structure for a chute assembly includes a tubular outer chute wall, one or more door flaps, a flange surrounding the door area, and one or more hinge members or areas connecting the door flap(s) to the outer wall and flange.

For styling purposes, it is desirable for the air bag deployment door in the instrument panel to be invisible when viewed from the passenger compartment. In other words, the visible or "Class A" surface of the instrument panel is preferably seamless. Therefore, a pre-weakened seam is required in the substrate (on the "Class B" side) to facilitate tearing open of the door during air bag deployment. In order to prevent torn or severed pieces of the substrate from being expelled into the passenger cabin, the door flap(s) of the chute attach to the substrate door area so that the door flap and hinge act as a tether. A common method to attach the chute door flap and flange to the substrate has been by plastic welding, such as vibration welding, hot-plate welding, and the like.

A typical passenger air bag door is designed to transfer airbag pressure loading created by the expanding air bag onto the tear seam to release the door as quickly as possible during a deployment. A clean and quick separation of the tear seam helps avoid material fragmentation during airbag deployment. A stiffer door can transfer the airbag loading to the tear seam quicker than a more flexible door, and results in less risk of fragmentation. Thus, one of the challenges in passenger air bag door design is to develop a chute and door system wherein the door has enough stiffness to effectively transfer the airbag deployment force to the tear seam while keeping both production costs and weight low.

A typical air bag chute structure is formed as a one piece thermoplastic injection molding combining a flange or collar for attaching to an instrument panel substrate, a door connected to the flange by a hinge, and a chute for connecting to an air bag module and providing a deployment path to the door. A common material is TPO (Thermoplastic Olefin) such as Dexflex™ or other materials that exhibit superior ductility at very cold temperatures at least to −30° C. and good toughness at high temperatures at least to 90° C. (e.g., TPE or TEO). Since the materials are somewhat flexible, door stiffness has been increased by adding ribs and/or increasing the material thickness. Since the chute assembly is injection molded, it is necessary to avoid a die-lock condition during the molding process—which limits the range of compatible rib shapes and sizes that can be used. Thus, the known methods may not achieve the desired stiffness and may result in other disadvantages such as increased cost and weight (e.g., an undesirable stiffness-to-weight ratio).

Because of the relative positions of an air bag module and the deployment door, and the orientation of the styled surface of the instrument panel, the resulting impact force of the expanding air bag against the door is slanted with respect to a direction perpendicular to the door. The invention further recognizes that the known orientations cause a shortening of the moment arm of the resultant force (with a concentration of force close to the door hinge) and that it would be desirable to increase the moment arm.

SUMMARY OF THE INVENTION

In one aspect of the invention, an air bag chute assembly for an automotive instrument panel comprises an outer flange configured to attach to the instrument panel around an aperture in the instrument panel. A tubular chute extends interiorly from the flange to a lower end configured to receive an inflating air bag from an air bag module and defines a deployment path along a longitudinal axis. A door flap is disposed in an upper end of the chute rotatable from the flange to emerge through the aperture. The flap has an interior side impacted by the inflating air bag carrying a plurality of raised strengthening ribs. The flap has at least one closed-section hollow channel protruding from the interior side to a channel height extending beyond the strengthening ribs.

DETAILED DESCRIPTION OF PREFERRED EMBODIMENTS

Figure 1:
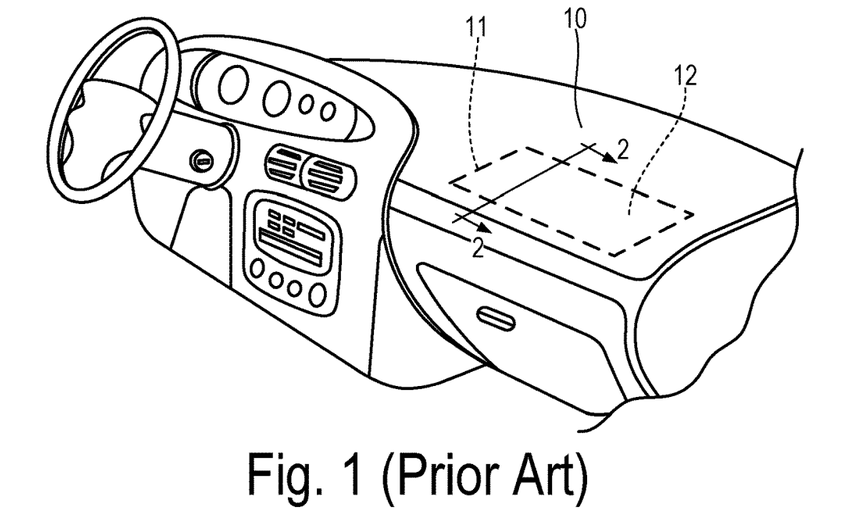
FIG. 1 is a perspective view of an automotive instrument panel system showing a passenger air bag deployment area.
Figure 2:
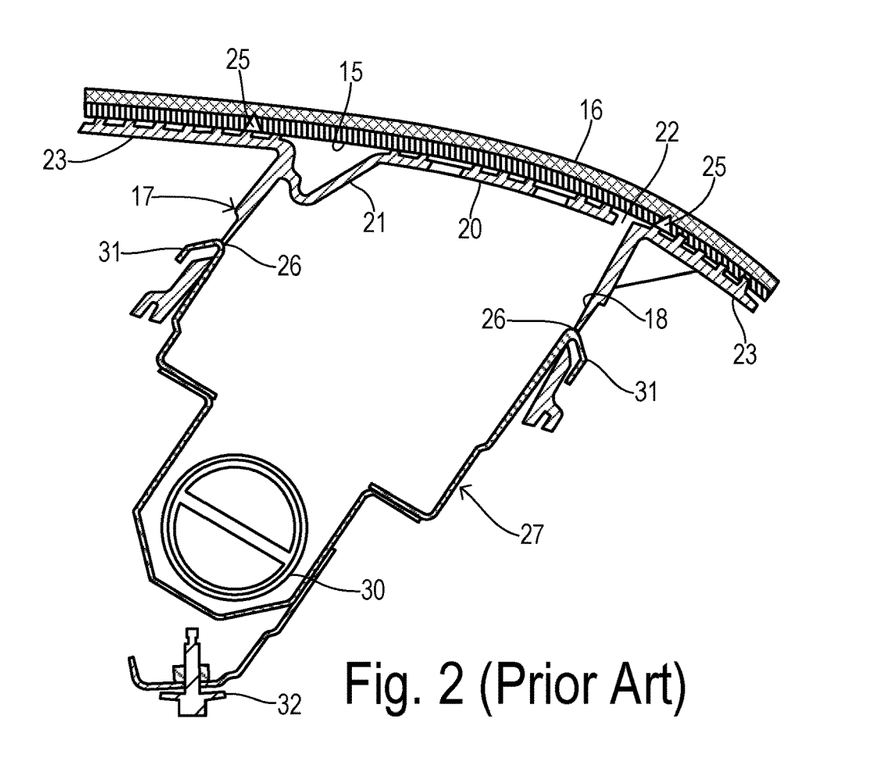
FIG. 2 is a cross-sectional view along line 2-2 of FIG. 1 showing one type of conventional passenger air bag system.
Figure 3:
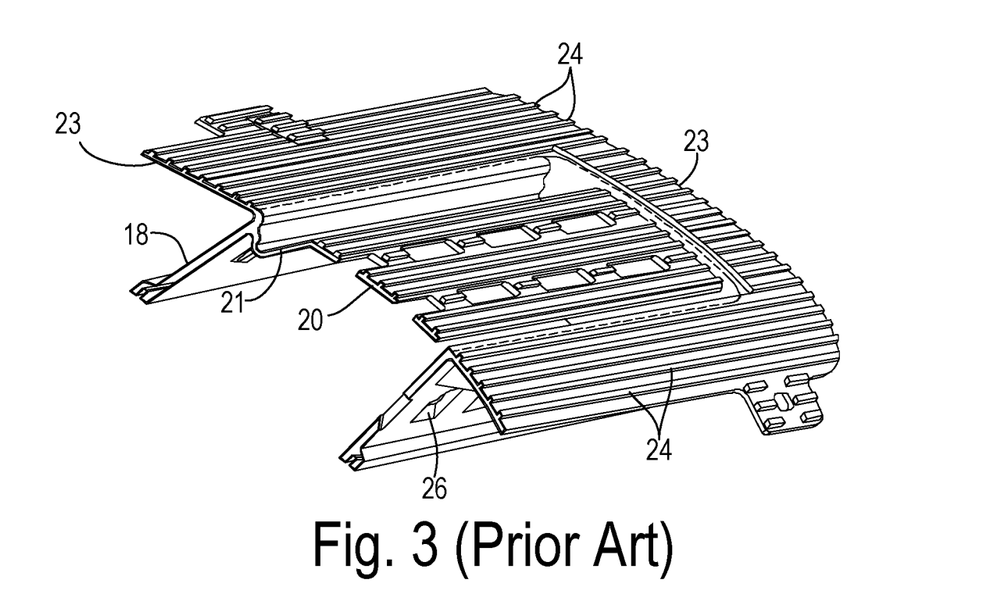
FIG. 3 is a cross-sectional, perspective view of the air bag chute assembly of FIG. 2.

Referring now to FIGS. 1-3, an instrument panel 10 includes a passenger air bag system with a hidden seam 11 defining a deployment door area 12. An instrument panel substrate 15 provides the desired shape and rigidity for the instrument panel. It is overlaid by a cover layer 16 which may include a conventional elastomeric skin and a layer of foam between the skin and substrate 15. A chute 17 includes a tubular passageway 18 and a deployment door flap 20 at the upper end thereof. Deployment door 20 is coupled to passageway 18 by a hinge 21 along one side. A gap 22 may define an outer edge on three sides of door 20, for example. Instead of a gap, a pre-weakened seam may define the door aperture which opens only after being severed during deployment. Chute 17 includes a flange (collar) 23 surrounding door 20. As better shown in FIG. 3, flange 23 and door 20 can have a plurality of welding ribs 24 for welding chute 17 to instrument panel substrate 15.

As shown in FIG. 2, instrument panel substrate 15 and covering layer 16 may include a hidden seam 25 for tearing during opening of deployment door 20. Seam 25 defines a door aperture which may be formed by mechanical or laser scoring prior to attachment of chute 17 by vibration welding. In some embodiments, the door aperture can be a complete opening within substrate 15. An air bag module 27 is mounted to a plurality of holes 26 in chute passageway 18. Air bag module 27 is comprised of a rigid box containing a propellant source 30 and a folded bag (not shown) that is guided along a deployment path defined by passageway 18 to door 20 upon inflation by gases from propellant source 30. Air bag module 27 includes a plurality of hooks 31 that are received in a corresponding plurality of windows 26. A fastener 32 couples air bag module 27 to a cross-car beam via a bracket.

For obtaining a desired strength and appearance, an instrument panel substrate and a chute assembly may be preferably formed of moldable thermoplastic materials. Preferred materials for the chute assembly include thermoplastic polyolefin (TPO), thermoplastic elastomers (TPE), and thermoplastic elastomer olefin (TEO). The most preferred material is TPO compounded with fillers that modify the material's melting temperature, flexural modulus (i.e., stiffness), and other properties.

Figure 4:
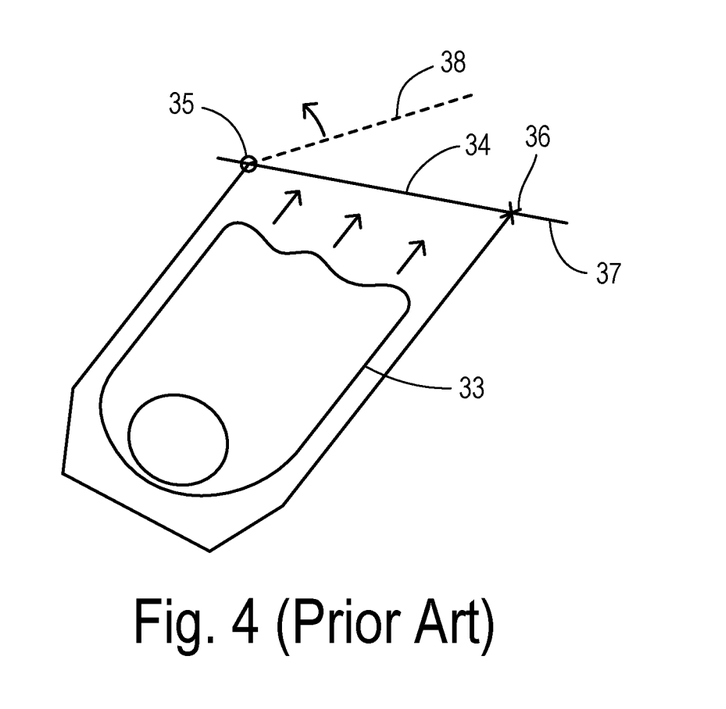
FIG. 4 is a diagram showing an air bag expansion and resulting pivoting movement of a door after tearing of a door seam.

FIG. 4 depicts the action of an expanding air bag 33 to impact an air bag door flap 34 between a hinge 35 and a tear seam 36 within a door aperture defined within a chute assembly outer flange/instrument panel substrate 37. Door flap 34 is substantially flat, although it may include stiffening ribs (not shown) as known in the art. In either case, the interior surface of door 34 which is impacted by air bag 33 is slanted with respect to the deployment direction of bag 33 (i.e., the longitudinal axis of the tubular chute is not perpendicular with the interior door surface). After the impact force of bag 33 succeeds in separating tear seam 36, door flap 34 pivots around hinge 35 to an open position 38 so that air bag 33 emerges to provide a passenger restraint.

Figure 5:
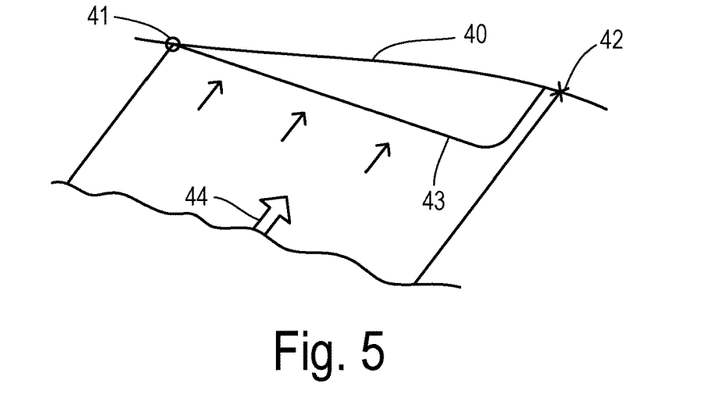
FIG. 5 is a diagram showing an improved door profile utilized in the present invention to increase efficiency of tearing of a door seam.
Figure 6:
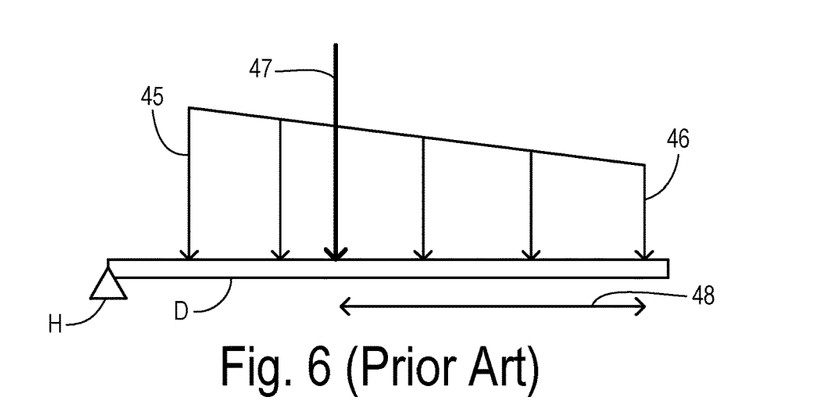
FIG. 6 shows a force diagram and moment arm according to a conventional door configuration.
Figure 7:
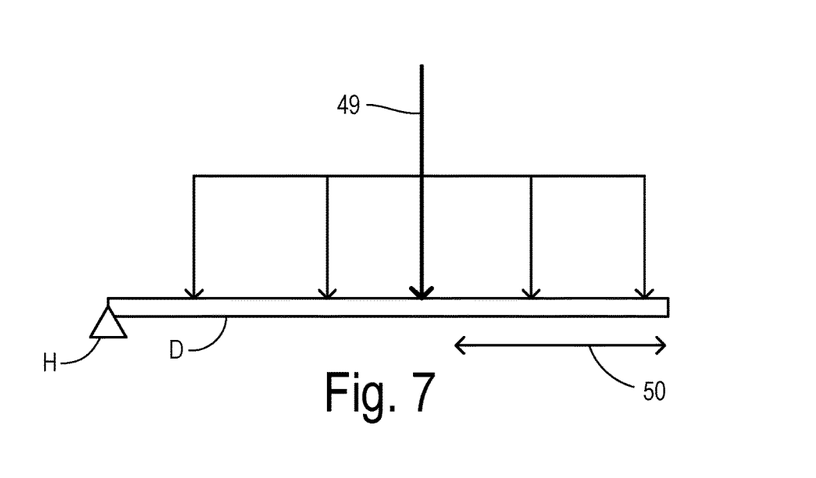
FIG. 7 shows a force diagram and moment arm according to an embodiment of the invention.

The invention modifies an air bag door as shown in FIG. 5, wherein a door 40 between a hinge 41 and a tear seam 42 includes an interior "push-surface" 43 having an increasing height from the outer face of door 40 in proportion to distance from pivot hinge 41. In consequence of the sloping of surface 43, it is less slanted with respect to a longitudinal axis 44 of the air bag deployment path within the tubular chute. By arranging push-surface 43 to be in an orientation which is more normal (i.e., perpendicular) to axis 44, a better transfer of force to tear seam 42 is obtained. This can be seen by comparing FIGS. 6 and 7. With the interior door surface slanting away from the air bag deployment path as in FIG. 4, the impact force of the inflating air bag one the door is concentrated toward the hinge as shown in FIG. 6. Thus, with a door D pivoting about a hinge H, a series of effective force vectors range from a maximum force 45 closest to hinge H and a minimum force 46 farthest from hinge H. An effective moment arm 47 of the sum of forces acts upon door D close to hinge H and at a distance 48 from the tear seam. With the interior door surface more nearly perpendicular to the air bag deployment path as in FIG. 5, the impact force of the inflating air bag one the door is more nearly constant between hinge H and the tear seam as shown in FIG. 7. An effective moment arm 49 of the sum of forces acts upon door D farther away from hinge H and at a distance 50 from the tear seam. With moment arm 49 being shifted away from hinge H and closer to the tear seam, the force transfer to the tear seam is increased. Therefore, the seam can be separated more quickly and uniformly, with less deformation of the chute assembly, and less fragmentation of material from the chute assembly, instrument panel, skin, and foam. Although stiffening ribs which are already used on an interior side of a door flap could be configured to provide a sloping height, the effect on force transfer would be minimal and a potential for damage to an air bag could be undesirable. Therefore, a structure which is wider than a stiffening rib is disclosed below. As shown in the embodiments described below, a slanted push-surface need not involve the entire interior surface of the door flap. Only an area sufficient to transfer a significant portion of the forces is necessary.

Figure 8:
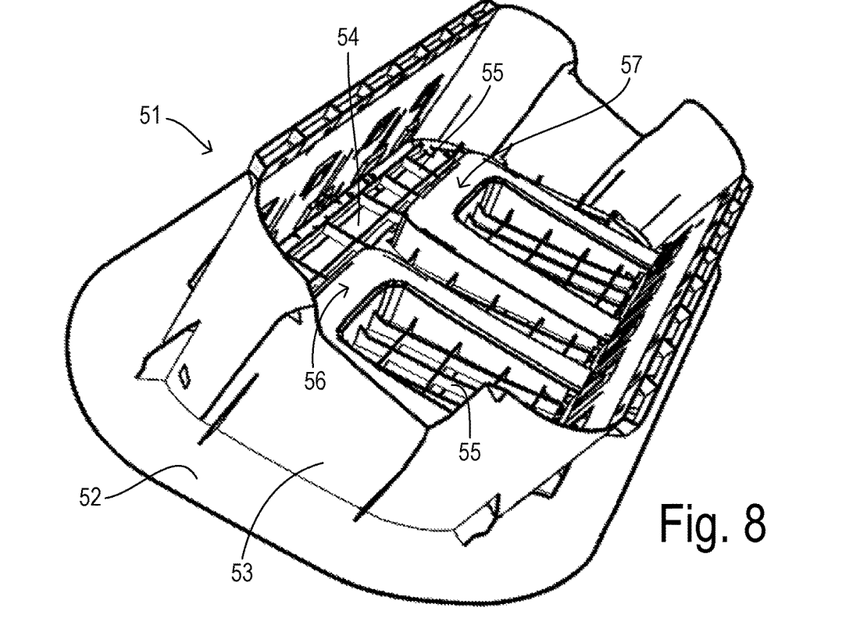
FIG. 8 is a bottom, perspective view of one preferred embodiment for an air bag chute assembly having a closed-section hollow channel for stiffening a door.
Figure 9:
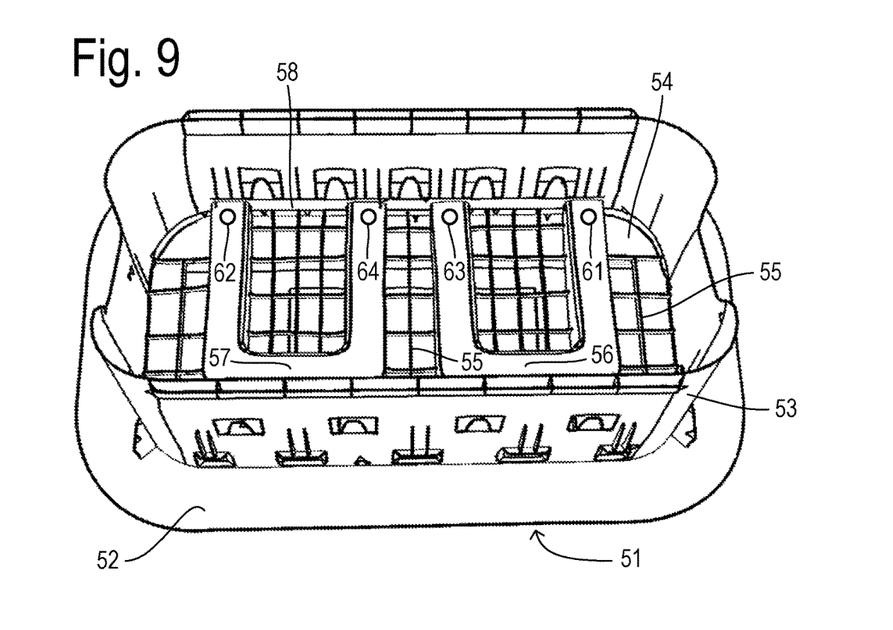
FIG. 9 is another bottom, perspective view of the chute assembly of FIG. 8.

Referring to FIGS. 8 and 9, an air bag chute assembly 51 has an outer flange 52 configured to attach to an instrument panel and a tubular chute 53 extending interiorly from flange 52. A door flap 54 is disposed in an upper end of chute 53 and is rotatable about a hinge 58 in order to emerge through an aperture in the instrument panel (not shown). A plurality of stiffening ribs 55 preferably extend in a raised fashion from an interior side of door flap 54 arranged in a grid structure. In order to provide even greater stiffening, at least one closed-section hollow channel 56 is provided protruding from the interior side of door flap 54 to a channel height greater than the height of ribs 55. As defined herein, "closed-section" refers to each hollow channel generally defining a closed perimeter around an internal channel along the major structure of the channel from its beginning to end as seen in transverse cross section, not including a channel inlet and a channel outlet at opposite ends of the channel associated with fabrication of the channel using gas-assisted injection molding as described below. In the embodiment of FIGS. 8 and 9, a pair of U-shaped channels 56 and 57 are disposed side-by-side, with each channel 56 and 57 having a variable channel height conforming to a slanted height profile creating a push-surface of the U-shaped channel which is substantially perpendicular to a longitudinal axis of tubular chute 53.

In order to form closed-section hollow channels 56 and 57 by gas-assist injection molding, a pair of gas inlets 61 and 62 and a pair of gas outlets 63 and 64 are provided for channels 56 and 57, respectively.

Figure 10:
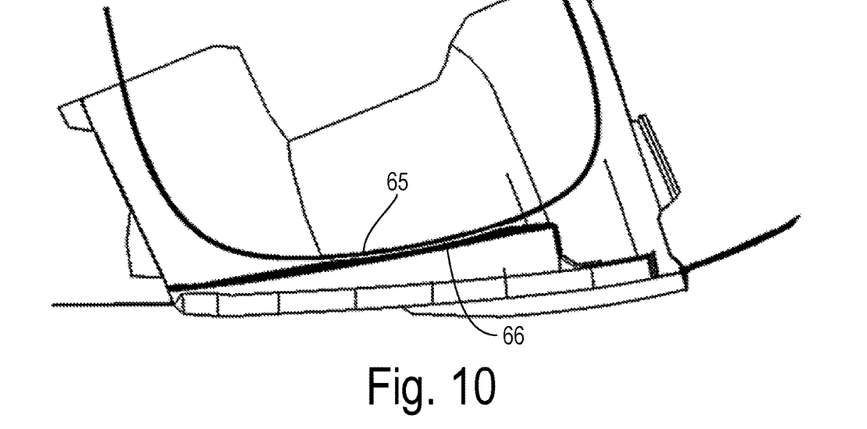
FIG. 10 is a side, diagrammatic view of an impacting air bag on the deployment door of the chute assembly of FIG. 8.

FIG. 10 illustrates an advancing air bag front 65 during deployment impacting a slanted height profile 66 of the closed-section hollow channels which act as a push surface which is substantially perpendicular to the longitudinal deployment axis of the airbag and results in improved force transfer for tearing the tear seam uniformly.

Figure 11:
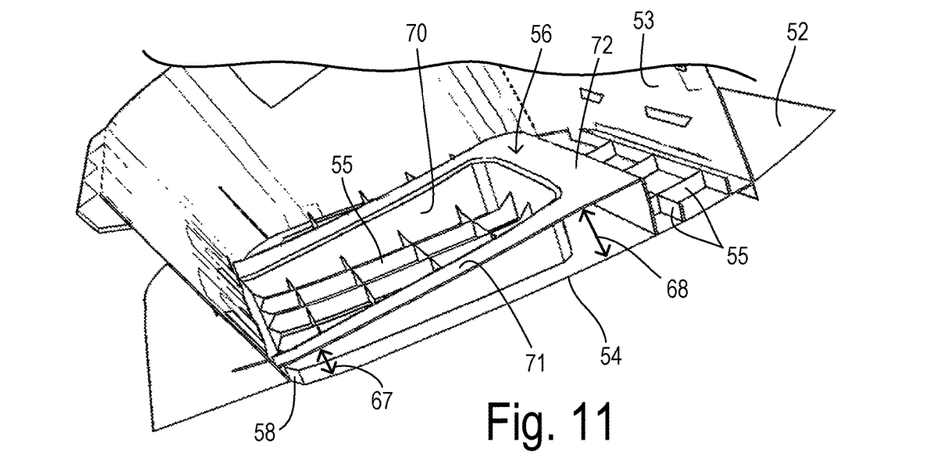
FIG. 11 is a side cross-sectional view of the chute assembly of FIG. 8.

In the cross sectional view of FIG. 11, a hollow interior of U-shaped channel 56 has a channel height extending from a top surface of door flap 54 which varies between a short height 67 close to a hinge edge 58 of the door flap and a greater height 68 away from hinge edge 58. Preferably, the variable channel height follows a height profile that causes a protruding side of hollow channel 56 to be perpendicular to the longitudinal axis of tubular chute 53. In addition, strengthening ribs 55 are preferably formed on the inner surface of the door flap both inside and outside the U-shaped profile of channel 56. More specifically, U-shaped hollow channel 56 includes side legs 70 and 71 with a gradually increasing height moving away from hinge edge 58. A remote side 72 of channel 56 completes the slanted portion. On average, channel 56 may provide a width-to-height ratio of about 2:1. In typical design, the channel may have a width of about 20 mm and a height (e.g., median height) of about 10 mm.

Figure 12:
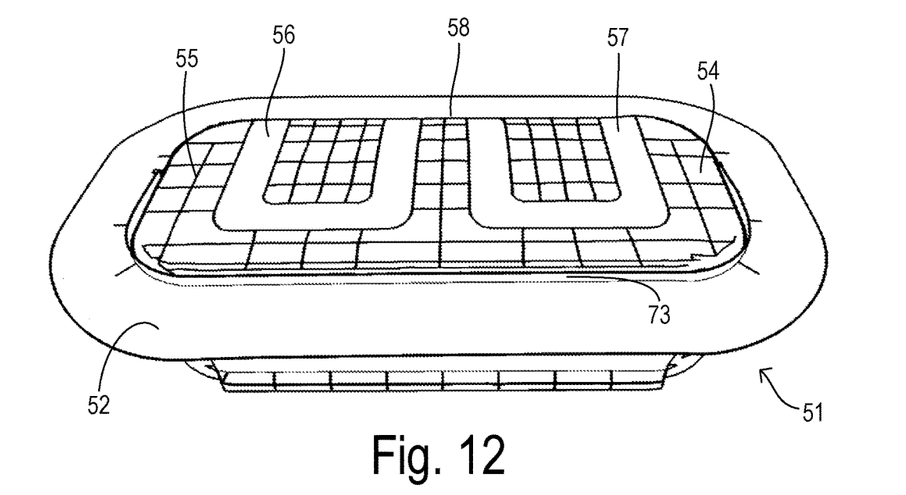
FIG. 12 is a top view of the chute assembly of FIG. 8.

In FIG. 12, a top side of chute assembly 51 shows a gap 73 between flange 52 and three sides of door flap 54 not including hinge edge 58. Although not actually visible from the top, the locations of ribs 55 and closed-section hollow channels 56 and 57 protruding from the hidden side of flap 54 are indicated in order to show the extent of increased stiffening across flap 54 which results in improved deployment performance.

Figure 13:
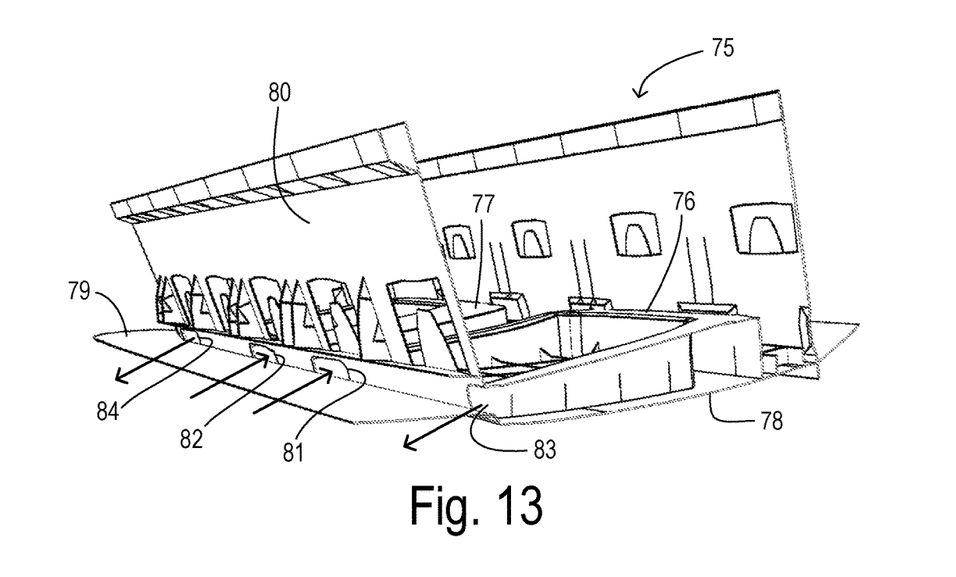
FIG. 13 is another side cross-sectional view of the chute assembly of FIG. 8.

Another embodiment of an injection molded chute assembly 75 in FIG. 13 includes U-shaped closed-section hollow channels 76 and 77 protruding from a door flap front surface 78 disposed within a flange 79 at the end of a tubular chute 80. Chute 80 has a longitudinal axis defining an air bag deployment path that is slanted with respect to a plane defined by flap front surface 78. Preferably, closed-section hollow channels 76 and 77 have a height profile that presents a push surface to an inflating air bag that is perpendicular to the longitudinal axis.

As in the previous embodiment, closed-section hollow channels 76 and 77 result from gas-assist injection molding. Channel 76 has an open inlet 81 coupled by the hollow interior of channel 76 to an open outlet 83. Channel 77 has an open inlet 82 coupled by the hollow interior of channel 76 to an open outlet 84. Arrows indicate the direction of inert gas flow during the gas-assist injection molding process. This process which is known in the art involves a first step of injecting a plastic material into a mold to fill all the intended solid regions of a molded part and to partially fill regions which are intended to provide a cavity (i.e., closed section, as with the hollow channels of the invention). While the injected plastic remains molten, an inert gas (e.g., nitrogen) is injected into and through the region(s) intended to form a cavity. As the gas travels between inlets 81/82 to outlets 83/84, it cores out hollow channels 76 and 77 by displacing the molten material against the corresponding mold surfaces. After cooling and demolding (i.e., removing from the mold), a unitary plastic body (including flange, chute, and door flap) is obtained wherein the inlets and outlets can remain open since the channels themselves provide the enhanced stiffness as a result of their structure. In the areas not occupied by channels 76 and 77, conventional stiffening ribs shorter than channels 76 and 77 may also be included.

Figure 14:
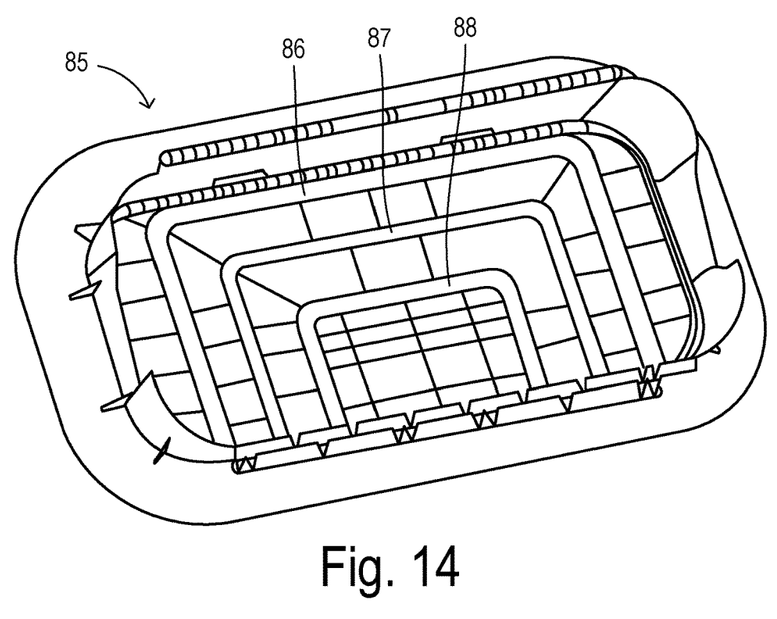
FIG. 14 is a bottom, perspective view showing another embodiment for an air bag chute assembly having nested closed-section hollow channels for stiffening a door.
Figure 15:
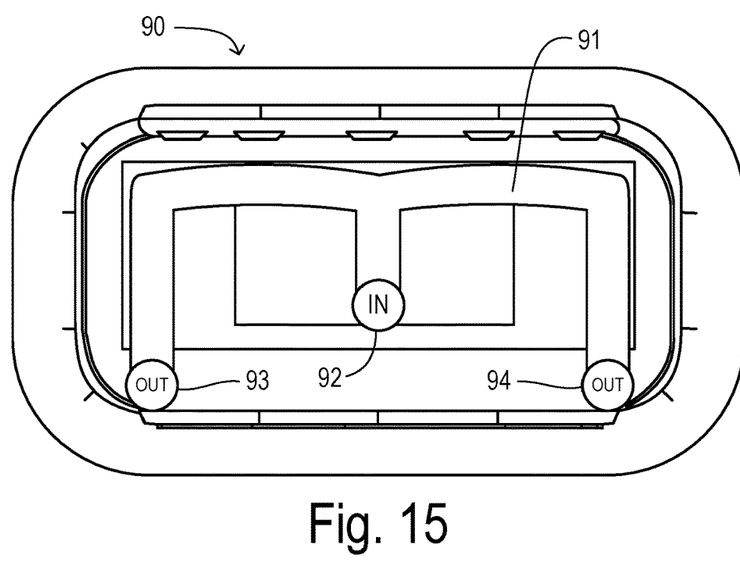
FIG. 15 a bottom view showing another alternative embodiment for closed-section hollow channels for stiffening a door.

Many other layouts for closed-section hollow channels to stiffening a deployment door flap can achieve the desired stiffening. For example, in FIG. 14 an air bag chute assembly 85 includes a series of nested U-shaped hollow channels 86, 87, and 88 formed by gas-assist injection molding. In FIG. 15, a chute assembly 90 is shown with a W-shaped hollow channel 91 formed by gas-assist injection molding using a gas inlet 92 and a pair of gas outlets 93 and 94.

Figure 16:
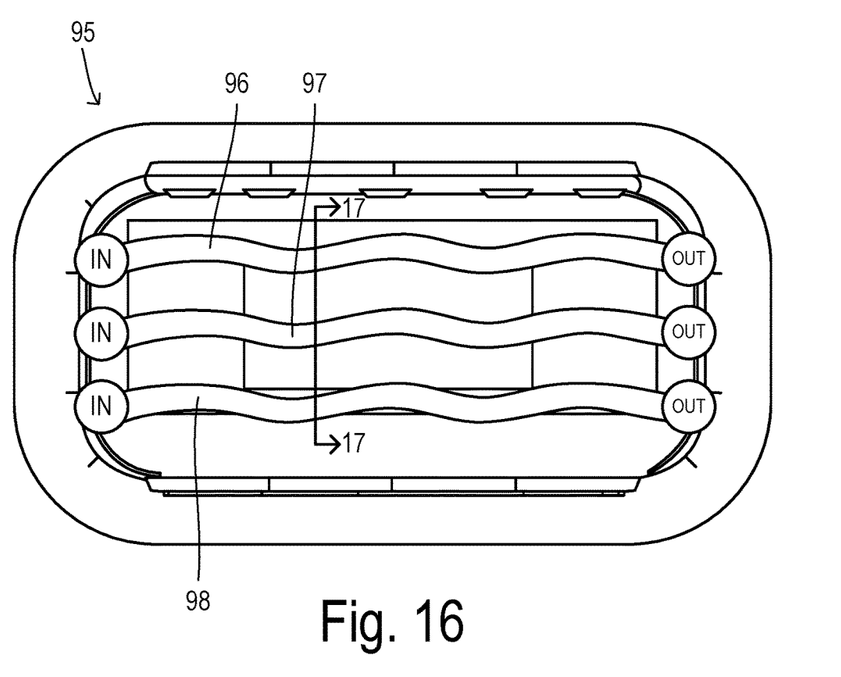
FIG. 16 a bottom view showing another alternative embodiment for closed-section hollow channels for stiffening a door.
Figure 17:
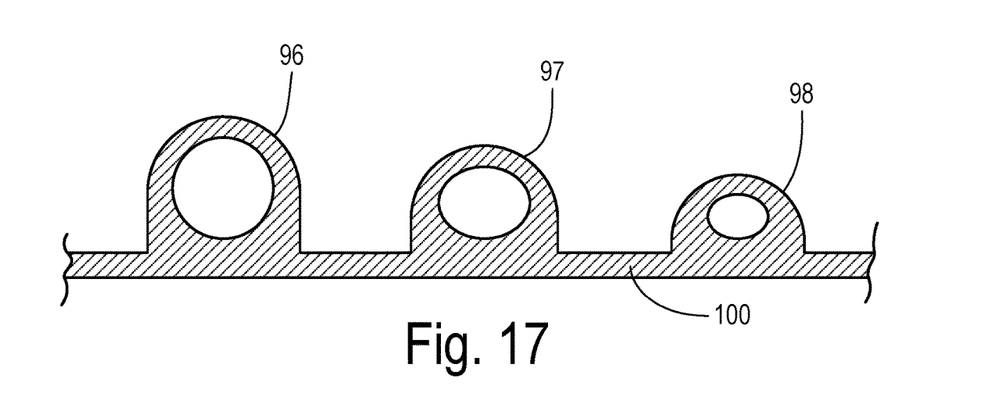
FIG. 17 is a cross section of the hollow channels along line 17-17 of FIG. 16.

As shown in FIG. 16, a series of side-by-side closed-section hollow channels 96, 97, and 98 parallel to a hinge edge are used in a chute assembly 95. Channels 96-98 may follow a wavy path in order to provide stiffening along multiple directions on the door flap. In order to also provide a variable channel height conforming to the height profile which is perpendicular to the longitudinal axis of the tubular chute, channels 96-98 preferably have different dimensions protruding from door flap 100 as shown in the cross section of FIG. 17.

Figure 18:
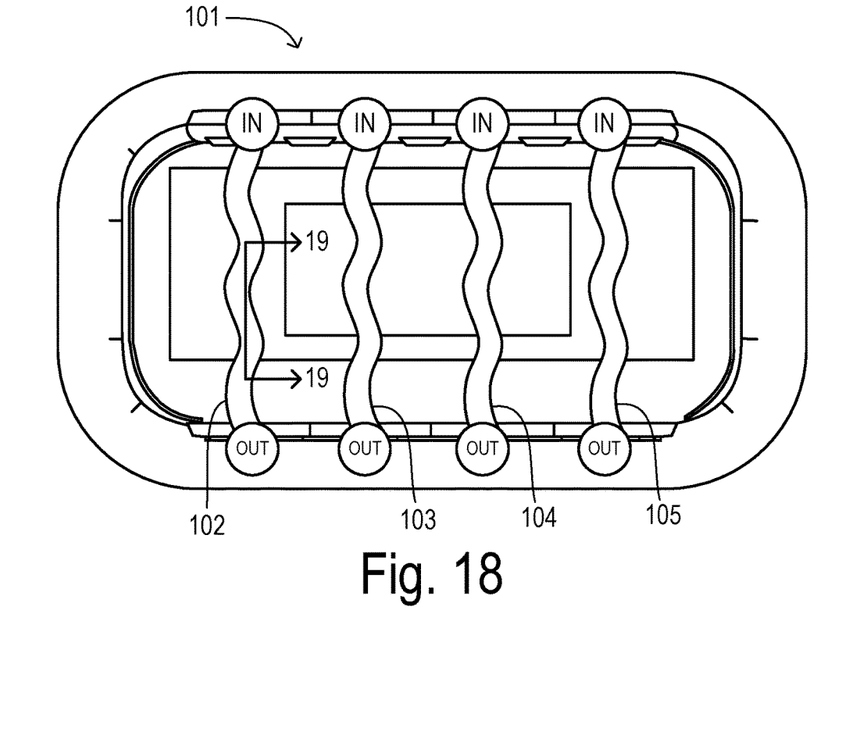
FIG. 18 a bottom view showing another alternative embodiment for closed-section hollow channels for stiffening a door.
Figure 19:
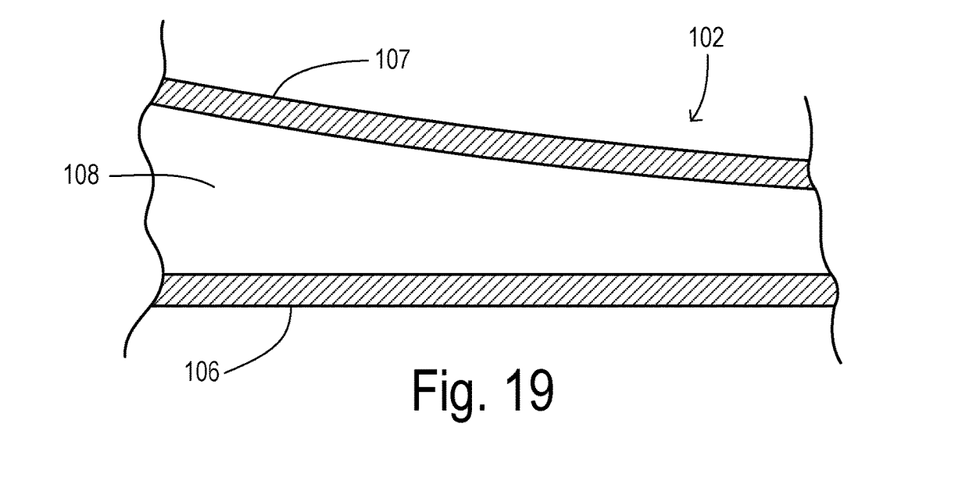
FIG. 19 is a cross section of the hollow channels along line 19-19 of FIG. 16.

A similar arrangement in FIG. 18 has a series of side-by-side closed-section hollow channels 102, 103, 104, and 105 perpendicular to a hinge edge in a chute assembly 101. Channels 102-105 may follow a wavy path in order to provide stiffening along multiple directions on the door flap. In order to also provide a variable channel height conforming to the height profile which is perpendicular to the longitudinal axis of the tubular chute, each channel has a corresponding slope. For example, channel 102 is shown in cross section in FIG. 19. Hollow channel 102 has a hollow cavity 108 between a door flap front wall 106 and a protruding channel wall 107 which slopes to provide an increasing channel height with increasing distance away from a hinge edge.

What is claimed is:

1. An air bag chute assembly for an automotive instrument panel, comprising:
    an outer flange configured to attach to the instrument panel around an aperture in the instrument panel;
    a tubular chute extending interiorly from the flange to a lower end configured to receive an inflating air bag from an air bag module and defining a deployment path along a longitudinal axis; and
    a door flap disposed in an upper end of the chute rotatable from the flange to emerge through the aperture, wherein the flap has 1) an interior side impacted by the inflating air bag carrying a plurality of raised strengthening ribs, and 2) at least one closed-section hollow channel protruding from the interior side to a channel height extending beyond the strengthening ribs.

2. The chute assembly of claim 1 wherein the longitudinal axis is slanted with respect to the flap, and wherein the channel height is variable such that it follows a height profile substantially perpendicular to the longitudinal axis.

3. The chute assembly of claim 1 wherein the closed-section channel has an open inlet and an open outlet adapted for forming the closed-section channel by gas-assisted injection molding.

4. The chute assembly of claim 3 wherein the flap has a hinge edge, wherein the closed-section channel is U-shaped with the inlet and the outlet adjacent the hinge edge, and wherein side legs of the U-shaped closed-section channel have a channel height which increases with an increasing distance away from the hinge edge according to the height profile.

5. The chute assembly of claim 3 wherein the flap has a hinge edge, wherein the assembly has a plurality of closed-section channels each extending substantially parallel to the hinge edge, and wherein the closed-section channels have respective channel heights which increase with an increasing distance away from the hinge edge according to the height profile.

6. The chute assembly of claim 1 wherein the assembly has a plurality of closed-section channels, wherein the longitudinal axis is slanted with respect to the flap, and wherein each closed-section channel has a respective channel height that follows a height profile substantially perpendicular to the longitudinal axis.

7. The chute assembly of claim 1 wherein the closed-section channel has a width greater than 150% of a maximum channel height.

8. A passenger air bag system, comprising:
an instrument panel substrate defining an aperture;
a chute assembly installed at the aperture; and
an air bag module mounted to the chute assembly and comprising an inflatable air bag for deploying through the chute assembly and aperture;
wherein the chute assembly comprises:
an outer flange configured to attach to the instrument panel around an aperture in the instrument panel;
a tubular chute extending interiorly from the flange to a lower end configured to receive the inflating air bag from the air bag module and defining a deployment path along a longitudinal axis; and
a door flap disposed in an upper end of the chute rotatable from the flange to emerge through the aperture, wherein the flap has 1) an interior side impacted by the inflating air bag carrying a plurality of raised strengthening ribs, and 2) at least one closed-section hollow channel protruding from the interior side to a channel height extending beyond the strengthening ribs.

9. The passenger air bag system of claim 8 wherein the longitudinal axis is slanted with respect to the flap, and wherein the channel height is variable such that it follows a height profile substantially perpendicular to the longitudinal axis.

10. The passenger air bag system of claim 8 wherein the closed-section channel has an open inlet and an open outlet adapted for forming the closed-section channel by gas-assisted injection molding.

11. The passenger air bag system of claim 10 wherein the flap has a hinge edge, wherein the closed-section channel is U-shaped with the inlet and the outlet adjacent the hinge edge, and wherein side legs of the U-shaped closed-section channel have a channel height which increases with an increasing distance away from the hinge edge according to the height profile.

12. The passenger air bag system of claim 10 wherein the flap has a hinge edge, wherein the assembly has a plurality of closed-section channels each extending substantially parallel to the hinge edge, and wherein the closed-section channels have respective channel heights which increase with an increasing distance away from the hinge edge according to the height profile.

13. The passenger air bag system of claim 8 wherein the assembly has a plurality of closed-section channels, wherein the longitudinal axis is slanted with respect to the flap, and wherein each closed-section channel has a respective channel height that follows a height profile substantially perpendicular to the longitudinal axis.

14. The passenger air bag system of claim 8 wherein the closed-section channel has a width greater than 150% of a maximum channel height.

* * * * *